Jan. 2, 1951  G. L. POWNALL  2,536,217
UNIT AND METHOD OF ICE PRODUCING AND HARVESTING
Filed Sept. 7, 1944  3 Sheets-Sheet 1
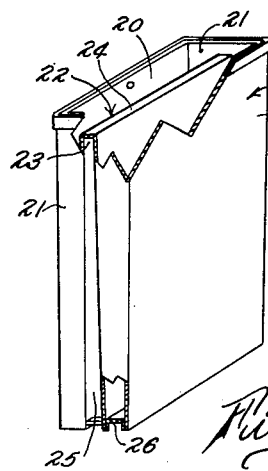
Fig. 1
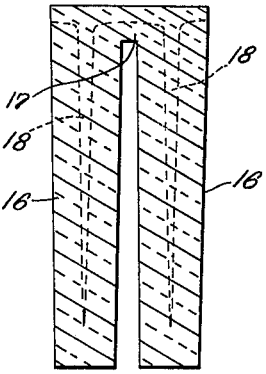
Fig. 2
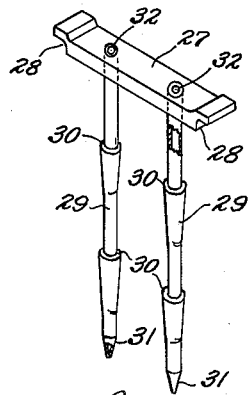
Fig. 5
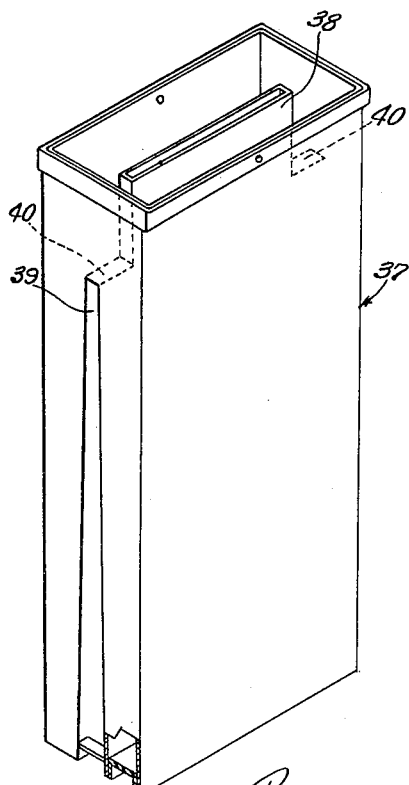
Fig. 3
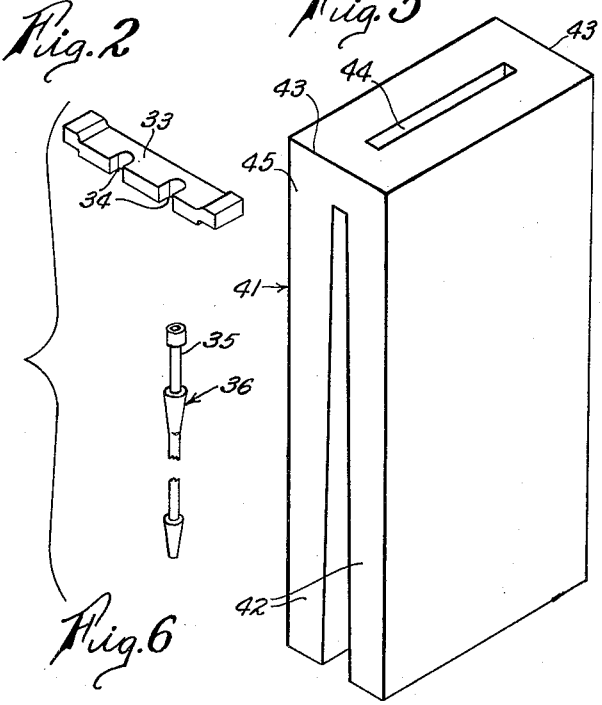
Fig. 6
Fig. 4
INVENTOR.
George L. Pownall
BY Murray, Sackhoff & Paddack
ATT'YS Jan. 2, 1951 G. L. POWNALL 2,536,217
UNIT AND METHOD OF ICE PRODUCING AND HARVESTING
Filed Sept. 7, 1944 3 Sheets-Sheet 2
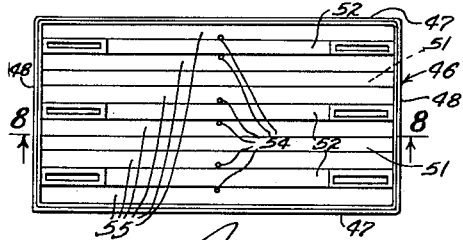
Fig. 7
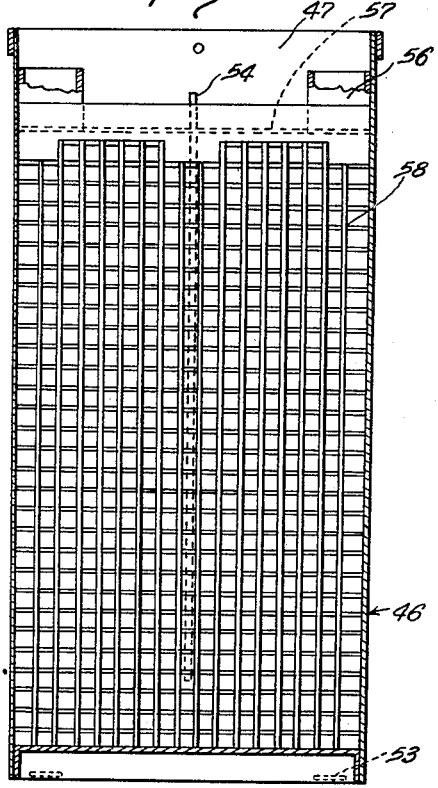
Fig. 8
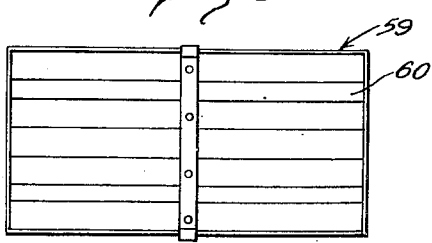
Fig. 11
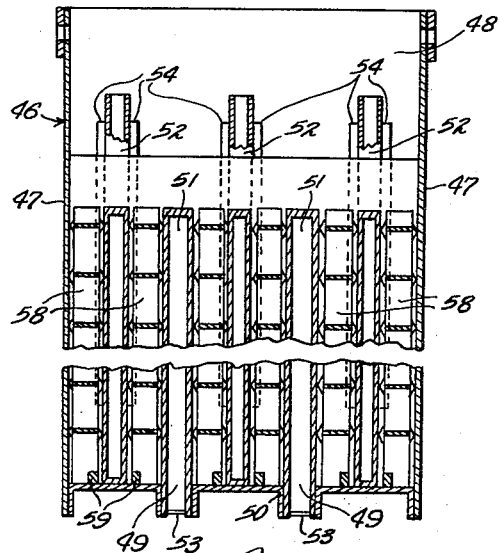
Fig. 9
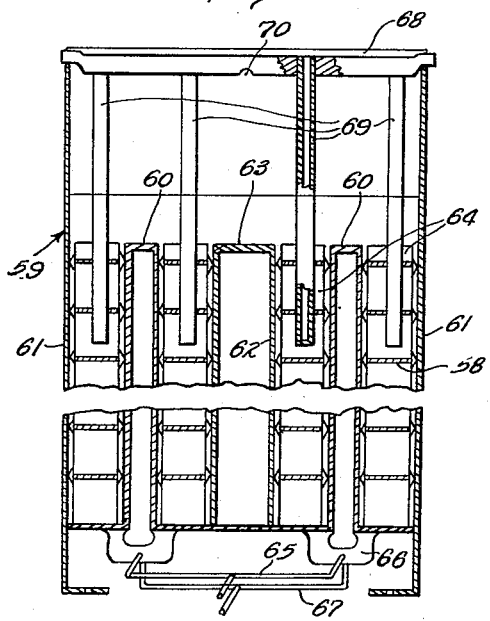
Fig. 10
Fig. 12
INVENTOR.
George L Pownall
BY
ATT'YS Jan. 2, 1951     G. L. POWNALL     2,536,217
UNIT AND METHOD OF ICE PRODUCING AND HARVESTING
Filed Sept. 7, 1944     3 Sheets—Sheet 3
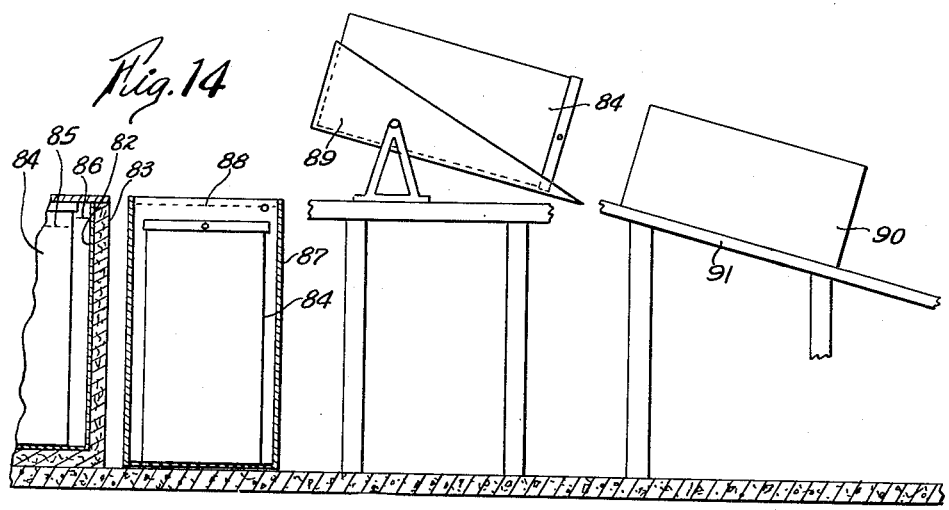
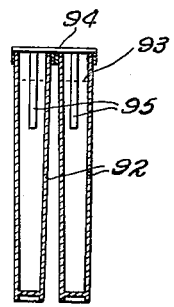
Fig. 15
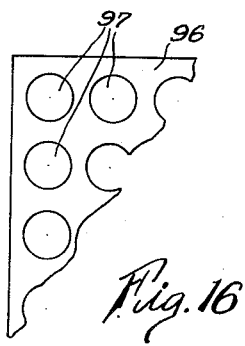
Fig. 16
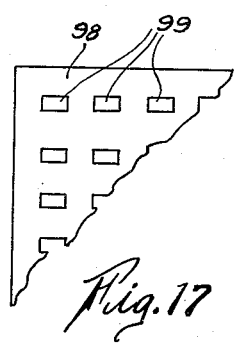
Fig. 17
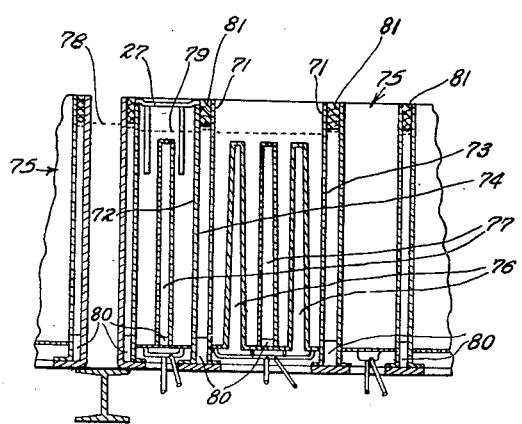
Fig. 13
INVENTOR.
George L. Pownall
BY
Murray, Sackhoff & Paddack
ATT'YS Patented Jan. 2, 1951

2,536,217

UNITED STATES PATENT OFFICE 2,536,217

UNIT AND METHOD OF ICE PRODUCING AND HARVESTING

George L. Pownall, London, Ohio

Application September 7, 1944, Serial No. 553,036

5 Claims. (Cl. 62—172)

The present invention relates to an improved method and means of making commercial ice in ice cans and has for an object method and means for the speedier freezing of heavy weight or commercial sizes of ice blocks.

Another object of the invention is to provide an improved freezing can structure which is adaptable to existing can spaces in commercial ice plants but which permits the more frequent harvesting of ice blocks having the over all dimension of the present day commercial sized block so that the handling and harvesting operations may proceed with equal convenience, utilizing the essential handling equipment in existing commercial ice plants.

Another object of the invention is to provide a method and means for commercially producing greater ice tonage in a lesser amount of freezing tank space.

A further object of the invention is to attain an increased speed of freezing of commercial sized ice blocks by utilizing a novel direction of freezing, namely, upwardly and diagonally outwardly from a point measurably below the top of the can in addition to the usual directions of freezing from the side, end walls and bottom of the can.

Another object of the invention is to provide a method and means embodying the aforesaid advantages and which may be used to produce either opaque or transparent ice.

Another object of the invention is to provide a method and means for accomplishing the foregoing objects by the use of either removable or stationary type cans.

A still further object of the invention is to provide ice can equipment for freezing ice in commercial ice plants with a notable saving in the required freezing equipment for new plants or with a considerable saving and a reduction of the load carried by existing ice plants in order to produce a given quantity of ice.

Still another and important object is to produce in a commercial ice plant, an ice block that, upon processing into sized ice, will result in a lesser amount of the less profitable snow or fine ice.

Another object is to provide commercial ice cans embodying the foregoing advantages and especially adapted for producing an unitary composite mass of easily separable ice cubes of selected shape according to the mold employed.

A further object of the invention is to provide an ice block of the same over all dimensions as the commonly known commercial sized ice block and which is handled in the same manner with a somewhat lesser hazard against tipping over when sliding on the long narrow side thereof, than with present day ice blocks.

These and other important objects are attained by the method and means herein described and exemplified in the accompanying drawings in which:

Fig. 1 is a perspective view of one form of ice can embodying the invention, part being broken away.

Fig. 2 is a longitudinal sectional view of a multi-slab ice block unit as produced by the can of Fig. 1.

Fig. 3 is a perspective view of a modified form of commercial size ice can embodying the invention, part being broken away.

Fig. 4 is a perspective view of a commercial size ice block as produced by the can of Fig. 3.

Fig. 5 is a perspective view of a double utility hollow drop rod structure for use in connection with cans that are in a grid or where the stationary type of can ice plant and in those plants in which the so-called can dogs are not used.

Fig. 6 is a perspective view showing a removable cross bar and, in separated relation, one of its tubular drop rods.

Fig. 7 is a top plan view of still another form of can embodying the invention and adapted for use in the production of a composite multi-slab unit of ice of commercial can size.

Fig. 8 is a cross-sectional view taken on line 8—8 of Fig. 7, part being broken away, and a table ice forming mold being shown in position therein.

Fig. 9 is a fragmental vertical cross-section through the can of Fig. 7 with table ice mold members in position therein.

Fig. 10 is a perspective view of a weight clip for use with the mold as shown in Fig. 9.

Fig. 11 is a top plan view of a stationary type ice can of the invention.

Fig. 12 is a fragmental vertical section of the stationary type ice can embodying the invention.

Fig. 13 is a fragmental cross-sectional elevational view of a stationary can type of ice freezing tank which includes both the conventional stationary can and several modified forms of the present invention in one installation.

Fig. 14 is a schematic side elevational view showing the co-related elements at the harvesting side of a loose can ice plant.

Fig. 15 is a vertical sectional view showing a pair of narrow independent ice cans with a spacer and drop rod structure for holding the cans and for retaining the frozen slab contents of the cans in parallel relation during harvesting and handling.

Fig. 16 is a fragmental side elevational view of an insertable mold for producing ice cylinders in the cans of the invention.

Fig. 17 is a fragmental side elevational view of a cube molding slab for use with the cans of the invention.

In this country it is practically universal practice to construct the ice freezing tank spaces of commercial ice plants to accommodate ice cans that are about 11 inches in width for the production of either the familiar 300 pound or 400 pound size ice block. In order to produce a given tonage of ice, much tank space, large numbers of ice cans and many hours of time are required for freezing these standard sized blocks. As an example, it is well established that it requires 42 hours to freeze a 300 pound block of ice in the standard can utilizing a brine temperature of 14° F. in the ice freezing tank and with a rapid flow rate of the brine past the cans. It is well known that the introduction of air under pressure into the water filled cans serves to segregate the suspended matter in the water for the production of clear transparent ice blocks. When the freezing has progressed sufficiently to establish a sediment containing water core in the block, this core water may be removed or replaced with distilled water or with ordinary tap water depending upon the grade of ice block to be produced. On completion of the freezing of this filled core space, the ice cans of the removable type are withdrawn singly or in grid supported groups and then submerged in a thawing water bath to free the ice bond where upon the cans are introduced into the so-called ice dump where the cans, supported on the narrow side, are tilted to allow the ice blocks to slide out of them edgewise onto and along a chute into a refrigerated storage room where the blocks are usually upended to stand on their bottoms until removed for sale in block form or for processing into small ice.

In the preparation of such small ice, the blocks are fed to a crusher where small ice pieces of many different sizes are produced and in addition thereto a relatively large quantity of so-called "snow" or fine ice which is usually either wasted or sold at a low price. More recently the ice pieces have been graded for size and the snow ice is, in some markets, considered a total loss.

By the method of the present invention the freezing can units are made up of two or more thin cans in slightly spaced relation and banded together at the top so that the unit occupies one of the existing can spaces in the freezing tank just as the single large block can of commerce occupies such a space. The water in the two or more thin compartments freezes much more quickly than in a single can of the aggregate thickness of all of these thin compartments.

It is the essence of the present invention to extend the respective compartments to a distance below the top of the ice can unit so that the can may be filled above the thin compartments and thus produce a top ice cap which is integral with the spaced apart slabs. Such improved ice blocks may be handled with conventional equipment in the same fashion as a solid block of ice. While the weight of such a block is slightly less than a standard solid block of ice, the time required for freezing it would be approximately only one-eighth (⅛) of the time required for freezing the standard solid block in the same brine tank under the same conditions. The junction of the two thin compartments of the ice freezing can unit is well below the water level therein and below the level of the brine in the freezing tank and hence in addition to the customary freezing inwardly of the side, ends and bottom walls, there is an upwardly and diagonally outwardly direction in which the freezing progresses from the top junction of the thin compartments. By taking advantage of the additional direction of freezing, the time factor is reduced and the ice cap or top joining piece is frozen as quickly as the thin slab portions joined by it. For practical purposes it is entirely satisfactory to provide the connecting "ice cap" in the approximate dimension of one-half (½) or more of the width of one of the thin compartments.

Reference is now made to the drawings in which Fig. 2 shows the improved ice block unit of the invention having two thin ice blocks 16—16 in closely spaced approximate parallelism and connected integrally at the top by an ice cap 17, the height or thickness of which is about one-half (½) or slightly more than one-half (½) the thickness of the blocks 16. For certain purposes the core water spaces indicated in dotted lines at 18, may be left unfilled. The can unit 19 of Fig. 1 comprises a pair of outside walls 20, a pair of end walls 21 and a thin rectangular center member 22 comprising spaced apart side walls 23 and a connecting top wall 24. The walls 21 have opposed slots 25, to the edges of which the walls 23 and 24 are connected. The space above these slots provides for the reception of water to form the ice cap 17 while the slot 25 constitutes a brine flow channel to permit freezing to progress from the brine, through exposed faces of the walls 23 inwardly and from the outside walls 20 inwardly, as well as upwardly from the bottom walls 26 of the thin compartments of the can unit. Freezing also occurs from the bottom of top wall 24 upwardly to assure the solid freezing of the ice cap 17.

If desired, for one or more of the following purposes, the drop tube structure of Fig. 5 or 6 may be inserted in the water filled can.

In Fig. 5 there is shown a double utility drop rod structure for use either in the stationary can system or in a so-called grid or group lift system, the cross bar 27 being shouldered at opposite ends, as at 28, to rest upon the tops of walls 20 of the can unit 19 as used in a grid lift plant (see Fig. 1) or to rest on the tops of walls 71 or 72 of stationary type can units 73 or 74 (see Fig. 13 wherein the stationary can unit is shown disproportionately wide and would in actuality be of the same width as the can unit 74 of the present invention and the ordinary stationary can unit 75). Fixed into the cross bar 27 for definitely positioning relative to the respective compartments of the cans, are hollow tubes or rods 29 having one or more tapered shoulders intermediate their ends, and having hollow points at their bottom.

In producing clear ice in a grid lift plant, air nozzle connections are made from existing sources to the open hollow tops 32 of the drop rods by any suitable connectors (not shown). When the ice block is frozen to a finished condition, the air nozzles are disconnected and the group or grid of cans is removed from the freezing tank by the existing crane mechan'sm and is carried to and submerged in the warm water bath in the so-called "dip-tank" for thawing the ice bond between the composite ice block and the can 19. The drop rod structure 27 remains frozen in the composite ice block during handling. When the ice bond is thawed, the group or grid of cans is lifted by the crane from the "dip-tank" and then placed into a commonly known ice can dump which turns the cans over at an angle so that the ice in the cans 19 will slide out of the cans onto a sloping chute. If the composite block is to be immediately submitted to a crusher, the cap end may be directed foremost down a steep inclined chute and against any suitable barrier which will cause the rods 29 to be driven into and to split each of the thin blocks in two. This shattering provides ice in a very thin form for the crusher and as is now understood in the art, these thin pieces of ice, when submitted to the action of an ice crusher will produce a relatively minimum quantity of the unprofitable or wasted "snow ice."

In the case of the stationary can type ice plant, the drop rod structure just described may be used without air connections, and with the bottom ends sealed off because the structure does not serve as a means for admitting agitating air to the water during freezing. In the stationary can plants, air connections are permanently fastened to the bottoms of the can units as for example as shown in Figs. 12 and 13. In this type of plant when the ice is frozen to a finished condition, warm brine is circulated around the cans and through each brine channel of the cans to thaw the ice bond between the composite ice block and the can walls. To release the ice bond at the bottom and also on other side walls of the unit that are not reached by the warm brine, a water spray is directed against such bottoms of the cans and also into the hollow interiors of the dividers, such as 60 in Fig. 12, and into the corresponding spaces 76 of Fig. 13. The action of the warm brine and warm water sprays releases the ice block from the can walls and bottom whereupon a crane connection is then made with the drop rod structure which is now frozen solidly into the composite ice block and the ice block is thus lifted bodily out of the can by the crane. The drop rod structure thus further serves as a lifting connection in this type of plant. The ice block is then taken to an ice dump and permitted to slide out of the dump essentially in the same fashion as hereinbefore described for grid plants for shattering the ice. If desired, however, the drop rod structure can be removed from the frozen block while it is at rest in the ice dump by inserting a thawing water needle into the hollow tubes so as to release the ice bond between the composite ice block and the drop rod by means of warm water. Thereafter, the composite ice block may be permitted to slide onto a chute and into a refrigerated storage room for later disposition. In stationary can plants for example, as exemplified in Fig. 12, drop rod structure 68—69 may be utilized instead of the drop rod structure 27.

From the foregoing it will be appreciated that tremendous savings in time, labor and money are effected throughout the process. The tonage of ice produced and the profit per ton of ice is increased.

Reference is now made to Fig. 6 which shows a modified form of drop tube structure to be used in those plants which employ can dogs for handling the ice cans. In this form a cross bar 33 has notches 34 in one side thereof for the reception of the restricted portions 35 of removable drop tubes 36. The member 33 serves to position the drop tubes during the production of clear opaque ice and may be laterally displaced and removed in order to expose the can dog holes in the can units, while the drop tubes remain in position to serve as means for shattering the respective slab elements in which they are inbedded.

Reference is now made to Figs 3 and 4 which show a modified form of can unit and finished ice block product thereof respectively. The ice can 37 of Fig. 3 differs essentially from the ice can of Fig. 1 in the provision of a hollow open topped core mold 38 having a width less than the width of the can 37 and extending from the top of the can downwardly to the top of the transverse brine flow channel 39 which is thus closed off only by short transverse wall sections 40. The resulting ice block 41 comprises a pair of spaced and substantially parallel ice slabs 42 connected in the vicinity of their top corners 43 but having an open slot 44 in the connecting top or ice cap portion 45. It will be understood that either of the drop tube structures of Fig. 5 or 6 may be employed in connection with the aforementioned can, if desired.

Reference is now made to Figs. 7–9 inclusive. This modified form of multi-can unit, like the previously described units, is dimensioned to be accommodated in the conventional can spaces in existing ice freezing tanks. The purpose of this modified form of freezing unit is to provide either very thin slabs of ice for processing into sized ice with a minimum of resulting "snow ice" or, with the aid of grid or mold members to form a multiplicity of table ice portions which can be handled as a unit mass and then easily separated into the individual table ice portions. For such purposes, the can unit 46 has a pair of side walls 47 of full can height and a pair of end walls 48 which are uniformly slotted upwardly at 49 and connected by inverted U-shaped wall members 50 to provide transverse brine flow channels 51 separating the interior of the can thickness into three compartments, each of which are further divided into two compartments each by hollow transverse spacer walls 52, the sides of which form non-freezing walls for adjacent sides of a pair of compartments, while the outside walls and the walls of the intermediate brine flow channels each provide a freezing wall for one of the compartments. The free bottom ends of the walls 50 are supported against deformation by short strut members 53 (see Figs. 8 and 9).

In order to produce clear transparent ice, thin air bubbling tubes 54 may be affixed to the exposed faces of the hollow partitions 52 which thus disposes the air bubbling function against the non-freezing wall of each of the water compartments 55. It will be noted that the hollow partitions 52 have open topped projections 56 which extend above the water level immediately adjacent the end walls of the can unit 46 and thus assure the provision of an ice cap as indicated in dotted lines at 57, connecting the top ends of the slabs which are frozen in the respective thin compartments.

The can unit 46 is adapted to receive table ice molds in the respective thin compartments. The direction of freezing with such inserted molds is from a freezing wall either on the outside of the can or on one of the brine flow channels, through the apertures in the mold, to a non-freezing wall constituted by one side of the hollow air filled partition and against which wall the air bubbling tube rests; and the action of the liberated air, in agitating the water in the mold, serves to accumulate the suspended insoluble particles and progressively carry them to the top of the mold. At the same time, the freezing of the ice cap 57 progresses inwardly from the side and end walls of the can unit and upwardly and outwardly from the bottom of the closed portion of the brine flow channels 51. Upon withdrawing the composite frozen block, it will be found that this block can be handled by means of existing equipment and traveled slidably on the longitudinal narrow edge. The thawing water bath employed to release the composite ice block unit enters through the open tops of the portions 56 of the hollow walls and this water is emptied out when the can unit is turned on an end wall for slidably discharging its frozen content.

As a means of providing an especially merchantable form of table ice, I have provided collapsible and destructible mold 58 made of notched strips of waxed cardboard after the fashion of the paper egg crate separators, one of such molds 58 being inserted in each of the thin compartments after weighting the bottom edge thereof with one or more split lead weights 59 (see Figs. 9 and 10) to assure seating of the molds in the extreme bottoms of the thin compartments. Such a mold forms a connected sheet of ice cubes with paper dividers between them, and the individual slabs of ice cubes may be readily broken away from the ice cap and further subdivided in the sale and distribution thereof, the thin cardboard dividers being torn in the process. The individual cubes are in a similar fashion detached for use in the drinking glass.

In Figs. 11 and 12 there is shown a stationary type ice can unit embodying the invention in a manner closely comparable to that as shown in Figs. 7, 8 and 9. The can unit 59 embodies hollow non-freezing partitions 60 with water-receiving thin compartments on either side thereof, and each of such water-receiving compartments has one freezing wall constituted either by a side wall 61 of a can or a side wall 62 of a brine flow channel member 63. The ice freezing, thin compartments 64 thus established are supplied with water to be frozen through a suitably fed pipe 65, having branch outlets 66, feeding to the bottom of several of the freezing compartments.

Pressure air for agitating the water during the freezing process is admitted to the compartments of the cans through connections 67. The thawing water spray nozzles and connections for spraying the can bottoms and the hollow spaces 60 are omitted since the details thereof are now well known in the art. The drop rod structure comprising a cross bar 68 and hollow tubes 69 connected thereto is arranged for support over the top edges of the can units such as 59 (see Fig. 12) or can units 73 and 74 (see Fig. 13). The cross bar 68 may be notched as at 70 for the reception of the crane lifting hook whereby the composite ice block is lifted bodily from the can unit after the warm thawing brine bath has been circulated around the can units and the water spray system has been employed to release the ice bond on the inner and bottom walls. The released block is then handled in the manner previously described. The thin compartments 64 may receive any type of ice mold therein, for example, a mold of destructible cardboard which may be an unwaxed mold of the form shown at 58 in Fig. 12.

In Fig. 13, which shows a stationary can freezing tank embodying two modifications of the can units of the invention in addition to a conventional stationary can, the unit 73 (shown in exaggerated width) has the spray water and non-freezing spaces 76 and a brine channel 77, whereas the can unit 74 adjacent it has only the brine flow channel 77. The lifting drop rod structure 27 is shown frozen in the finished ice block in the can unit 74. The brine level is indicated in dotted lines at 78, while the level of the finished ice block is shown at 79.

In Fig. 13 the ice can tank preferably has asphaltic insulation at 80 and may carry the usual wooden frame members 81. The spray water nozzles and their connections are omitted but the air and filling water connections to the bottoms of the cans are shown (unnumbered and generally corresponding to the showing in Fig. 12).

In the schematic showing in Fig. 14, the ice tank 82 has the customary insulation 83 around the side, ends and bottom and is adapted to receive, in the usual fashion, the loose can units 84, wherein the finished level of the ice in the can is shown at 85. The brine level in the tank is shown in dotted lines at 86. The dip-tank 87 is disposed alongside the freezing tank and has one of the can units 84 resting therein and completely submerged below the level 88 of the warm water bath. The can dump 89 is shown in tilted position with a can unit 84 therein. An ice block of the invention 90 is shown on suitably supported ice chute 91.

In Fig. 15 there is shown a pair of independent thin ice cans 92 with ice blocks frozen therein to the dotted line level 93 and retained for handling as a unit by a spacer bar 94 with drop rods 95 fixed therein and frozen into the ice. This rod structure and bar holds the two narrow ice blocks together after they are thawed and dumped, without the aid of an ice cap as in the case of the blocks in Figs. 2 and 4.

In Fig. 16 there is shown a fragment of an insertable slab mold 96 with cylindrical ice molding apertures 97 therein.

In Fig. 17 there is shown fragmentally an insertable ice mold slab 98 having cubical mold apertures 99 therein. These molds may be employed in thin compartments of the cans of the invention to provide table ice portions having shapes corresponding to the mold apertures.

What is claimed is:

1. An ice block comprising a plurality of substantially parallel, wide thin ice slabs, an integral ice cap portion connecting said slabs in spaced relation at one end thereof, table ice mold members disposed in each of the slabs and open topped and closed bottomed drop rods frozen through the said cap and into the tops of the respective slabs.

2. As a new article of manufacture, a plurality of spaced apart, wide thin ice slabs, each having destructible multiple mold members throughout, and a common ice cap connecting all of said slabs at the top ends only whereby the mass is movable as a block unit for subsequent separation into slabs which are in turn separable into table ice portions or groups of table ice portions by destruction of the slabs and molds.

3. As a new article of manufacture, a plurality of substantially parallel, spaced thin ice slabs, apertured mold members confined within the respective ice slabs and a common connecting means at one end of said slabs for retaining them as an edgewise slidable unit, said means comprising open topped and closed bottom, hollow drop rods frozen into the slabs and a cross bar joining the rods exteriorly of the slabs.

4. An ice block comprising a plurality of wide thin ice slabs having adjacent major faces in spaced substantial parallelism, an integral solid cap portion extending across a common end of said slabs and connecting said slabs in spaced relation, a tubular open topped, closed bottomed drop rod frozen into each slab longitudinally thereof and projecting above said cap and a common connecting bar joining the drop rods exteriorly of said cap portion.

5. As a new article of manufacture, a plurality of substantially parallel, spaced wide, thin ice slabs, apertured mold members within the confines of each slab, and a common connecting means for retaining said slabs as a slidable non-tipping handling unit, said means comprising hollow, open-topped, and closed bottom drop rods frozen longitudinally of said slabs and a transverse bar joining the rods exteriorly of the slabs.

GEORGE L. POWNALL.

REFERENCES CITED

The following references are of record in the file of this patent:

UNITED STATES PATENTS

| Number | Name | Date |
|---|---|---|
| 236,647 | Sweeney | Jan. 11, 1881 |
| 695,907 | Buckingham | Mar. 25, 1902 |
| 936,452 | Havenstrite | Oct. 12, 1909 |
| 973,434 | Howe | Oct. 18, 1910 |
| 1,547,709 | Winfree | July 28, 1925 |
| 1,909,030 | Wheeland | May 16, 1933 |
| 1,996,049 | Pownall | Mar. 26, 1935 |
| 1,996,050 | Pownall | Mar. 26, 1935 |
| 2,076,208 | Richter | Apr. 6, 1937 |
| 2,341,700 | Drack et al. | Feb. 15, 1944 |

FOREIGN PATENTS

| Number | Country | Date |
|---|---|---|
| 246,340 | Germany | Apr. 29, 1912 |